United States Patent [19]
Clark

[11] Patent Number: 5,530,582
[45] Date of Patent: Jun. 25, 1996

[54] FIBER SOURCE FOR SEEDING AN ULTRASHORT OPTICAL PULSE AMPLIFIER

[75] Inventor: William G. Clark, Pittsford, N.Y.

[73] Assignee: Clark MXR, Inc., Dexter, Mich.

[21] Appl. No.: 427,060

[22] Filed: Apr. 24, 1995

[51] Int. Cl.⁶ .................. H01S 3/00; H04B 10/04
[52] U.S. Cl. .................. 359/333; 359/341; 359/184
[58] Field of Search .................. 359/333, 341, 359/184

[56] References Cited

U.S. PATENT DOCUMENTS

| | | | |
|---|---|---|---|
| 3,875,422 | 4/1975 | Stolen | 307/88.3 |
| 5,162,940 | 10/1992 | Brandelik | 359/333 |
| 5,309,535 | 5/1994 | Bergano et al. | 385/38 |

OTHER PUBLICATIONS

Technique for obtaining high–energy ultrashort pulses from an additive–pulse mode–locked erbium–doped fiber ring laser. K. Tamura, et al. Reprint from Optics Letters, vol. 1, Jan. 1, 1994.

*Primary Examiner*—Mark Hellner
*Attorney, Agent, or Firm*—Cumpston & Shaw

[57] ABSTRACT

An apparatus for seeding a solid-state, ultrashort optical pulse amplifier system comprises an excitation source that pumps a gain medium which is restricted to the core of an optical fiber. The gain medium is disposed in a resonant cavity with components arranged to produce ultrashort pulses of light at a fundamental wavelength. Such systems are well known to those skilled in the art. These ultrashort pulses are then frequency-doubled in a non-linear crystal to produce a seed pulse whose doubled frequency substantially matches that of the amplifier gain medium. These seed pulses are then injected into the amplifier wherein they are amplified.

57 Claims, 1 Drawing Sheet ns produce pulse trains with pulse separations in the range from 20 ns to 1 μs.

FIBER SOURCE FOR SEEDING AN ULTRASHORT OPTICAL PULSE AMPLIFIER

FIELD OF THE INVENTION

The subject invention relates to the combination of a fiber optic light source and an ultrashort pulse amplifier in which the light source comprises a fiber optic gain medium that generates ultrashort pulses at a wavelength substantially longer than the wavelength of operation of a solid-state, ultrashort pulse amplifier. These fundamental wavelength ultrashort pulses are frequency converted to another shorter wavelength that lies within the gain bandwidth of the amplifier, in a manner that substantially maintains their ultrashort pulse width. The frequency converted pulses are then seeded into the solid-state, ultrashort optical pulse amplifier, and amplified therein.

More particularly, this invention relates to the use of laser source that employs an Erbium-doped fiber as the gain medium to generate ultrashort optical pulses that are then frequency doubled to produce a seed pulse at a wavelength of approximately 780 nm. These seed pulses are then amplified in an ultrashort optical pulse amplifier that uses solid state materials like Ti:Sapphire as the gain medium.

BACKGROUND OF THE INVENTION

In the discussion to follow amplifier(s) is taken to mean a solid-state ultrashort optical pulse amplifier(s) of the regenerative or multipass type, or combinations of the two which use solid-state materials to amplify optical pulses with durations Full Width, Half Maximum, (FWHM), less than one nanosecond duration. These amplifiers have become an important tool for the study of the temporal behavior of phenomena in nature, for the study of nonlinear effects in physics, chemistry, electronics and biology, and for the generation of short pulses in the UV, VUV and X-ray regions. Their high peak power makes them ideal sources for producing ultrashort pulses at virtually any wavelength of interest through the use of processes like parametric amplification.

Heretofore, amplifier systems for generating ultrashort pulses are seeded by pulses that are generated in oscillators whose fundamental output wavelength falls within the gain bandwidth of the medium used to amplify them. A well known example is the commercially successful regenerative amplifier system that use Titanium-doped Sapphire as the gain medium. This system is seeded by a pulse generated in a mode-locked, external cavity oscillator containing a bulk Ti:Sapphire gain medium. These oscillators are in turn pumped by other lasers like an argon ion laser (or by a diode or diode array, if the gain medium were, for example, Li:SAF, Li:SGAF or Li:CAF). Although useful, this "laser-pumped laser" configurations have a number of undesirable characteristics. First, because regenerative amplifiers generally use some switching device like a Pockel Cell or Acousto-optic (A/O) switch that is driven by fast electronics to trap the seed pulse in the amplifier portion of the cavity, and because these devices have finite (several ns duration) rise times, the seed pulse train produced by this type of oscillator source must have pulse separation times that are sufficient to ensure that the Pockel Cell electronics can select only one pulse for injection from the train of pulses generated by the oscillator. Generally, most Ti:Sapphire oscillators have a cavity round trip time of about 10 ns. This is marginally sufficient to ensure that only one pulse is injected into the amplifier at a time, and places restrictions on the speed at which the electronics must operate. It would be desirable to increase the time separation between seed pulses to relax the requirements on the Pockel Cell or A/O switch, and also increase pre-pulse and post-pulse extinction ratios. This quickly becomes impractical with standard Ti:Sapphire oscillators because the greater temporal separation between seed pulses makes for a long cavity. Long external cavities possess greater sensitivity to misalignment which makes for less stable performance, and for a larger footprint.

An additional undesirable feature of known oscillator-amplifier combinations is that a Ti:Sapphire oscillator is itself pumped with an argon ion laser. Argon ion lasers are expensive to purchase, operate and maintain. And, like most laser-pumped lasers, precision alignment must be maintained between the pump beam and the active gain volume in the Ti:Sapphire rod. This is especially important when the seed laser oscillator is Kerr Lens or self-mode-locked, because these systems are extremely sensitive to even minor changes in the degree of overlap of the pump beam with the active gain volume in the Ti:Sapphire oscillator gain medium. This fact places additional restrictions on both the mechanical and thermal stability of the environment in which they can be operated. And because argon ion lasers are relatively large devices, their use in combination with a Ti:Sapphire oscillator makes for a bulky and expensive system that only a scientist could use. If this technology is to find widespread use in less esoteric environments than the research laboratory, it must be made less sensitive to the thermal and mechanical properties of the environment in which it is used. Additionally, the amount of space consumed must be kept to a minimum, the utility requirements readily available, and the power consumption within reasonable limits.

Lasers that use a doped-fiber as the gain medium can be made to have cavity lengths that are longer than equivalent external cavity designs—producing pulse trains with pulse separation times that are a factor of 2 to 100 times longer than those which are realistically achievable with external cavity configurations. A fiber gain medium can be coiled into a relatively small space so the effective footprint can be made quite small. A fiber laser gain medium can be diode-pumped, and because diodes are themselves small, efficient, have less stringent utility requirements, and do not consume much power, all the undesirable features of the argon ion pump laser can be eliminated by using a diode-pumped fiber seed laser. Moreover, a diode-pumped fiber laser based seed source can be made impervious to mechanical and thermal perturbations. All these characteristics give fiber lasers a robustness, and compactness that cannot be duplicated by traditional seed oscillator designs.

However, there are no diode-pumped fiber laser sources with emission wavelengths in the near IR where most of the broad gain bandwidth materials like Ti:Sapphire operate. Indeed, it is unlikely that an fiber-laser can be made to operate in this range, even if a suitable dopant material was available, because of large group velocity dispersion (GVD) in this wavelength region. Even within some existing fiber lasers like the Erbium-doped fiber oscillator, it has been found to be advantageous to incorporate GVD compensation mechanisms in the form of a negative GVD component to balance the positive GVD existing in the material at its operating wavelength, or use external normal or anomalous GVD mechanisms to compensate for chirp on the pulse.

SUMMARY OF THE INVENTION

It is an object of the present invention is to provide an apparatus and method for seeding an amplifier that has large temporal pulse separation, that possesses stable, robust operational characteristics, and has a small footprint.

It is a further object of the present invention to provide an apparatus and method for seeding an amplifier that operates at a fundamental wavelength that does not overlap the gain wavelength of the amplifier medium.

It is a still further object of the present invention to provide an apparatus and method for seeding an amplifier whose fundamental wavelength of operation is at half the operational wavelength of the amplifier gain medium.

It is a still further object of the present invention to provide an apparatus and method for frequency doubling the output of the fundamental wavelength of the ultrashort pulse source in order to generate a seed pulse in the wavelength range that falls within the operating wavelength of an amplifier.

An apparatus for seeding a solid-state, ultrashort optical pulse amplifier system comprises an excitation source that pumps a gain medium which is restricted to the core of an optical fiber. The gain medium is disposed in a resonant cavity with components arranged to produce ultrashort pulses of light at a fundamental wavelength. Such systems are well known to those skilled in the art. These ultrashort pulses are then frequency-doubled in a non-linear crystal to produce a seed pulse whose doubled frequency substantially matches that of the amplifier gain medium. These seed pulses are then injected into the amplifier wherein they are amplified.

DETAILED DESCRIPTION

Figure 1:
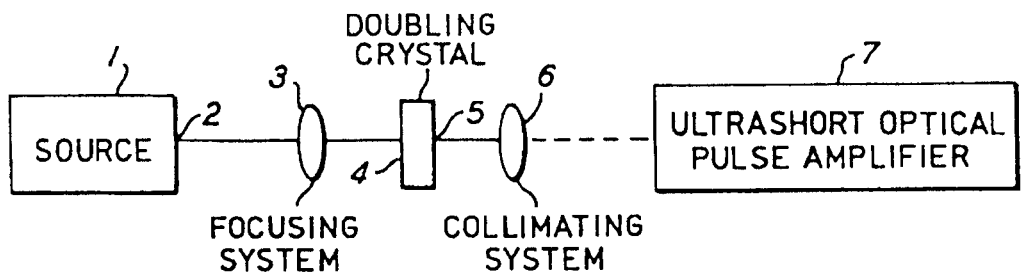
FIG. 1 shows a schematic plan view of a preferred version of the invention.

A preferred version of the invention is shown in FIG. 1. A mode-locked erbium-doped fiber ring laser, 1, such as the laser described by Tamura, K., C. R. Doerr, L. E. Nelson, H. A. Haus, and E. P. Ippen, "Technique for obtaining high-energy ultrashort pulses from an additive-pulse mode-locked erbium-doped fiber ring laser.", OPTICS LETTERS, Vol. 19, No. 1, Jan. 1, 1994, p. 46–48, generates pulses of 100 fs duration FWHM at 48.2 MHz.

Figure 2:
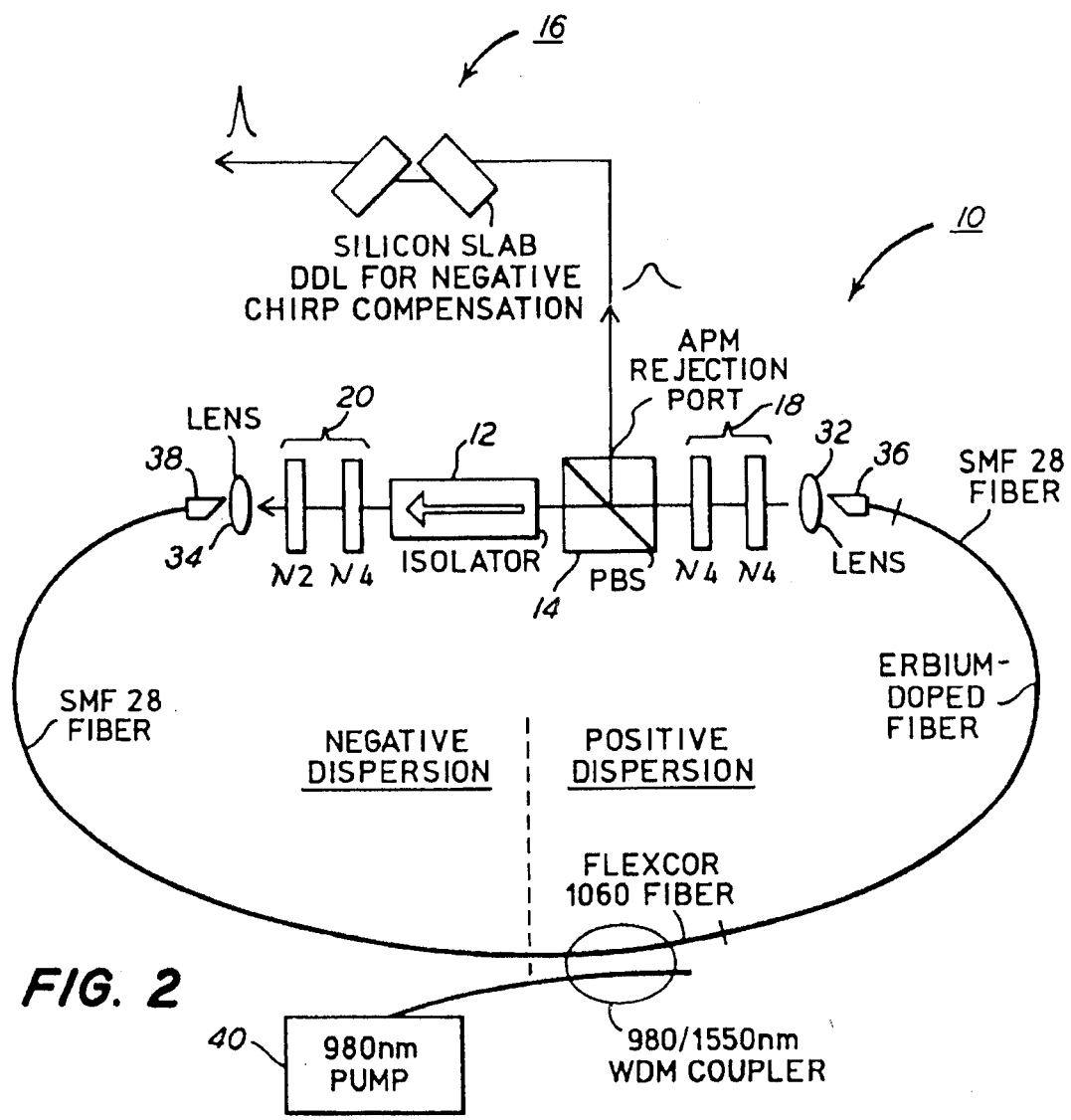
FIG. 2 is a schematic diagram of a mode locked erbium doped ring laser in accordance with the invention.

The fiber ring laser source 1 is shown in more detail in FIG. 2. The figure shows a unidirectional polarization additive pulse mode-locked (APM) fiber ring laser designated generally at 10 that includes a bulk polarization sensitive isolator 12 for forcing unidirectional operation of the ring. A polarizing beam splitter (PBS) 14 is coupled to the input of the isolator, and the S polarization input of PBS 14 provides a linearly polarized output pulse that is preferably connected to a silicon slab dispersion delay line 16 for negative chirp compensation.

A first pair of bulk wave plates 18 is placed before the isolator and a second pair of bulk wave plates 20 is disposed after the isolator in the direction of circulation. Preferably, a pair of quarter wave plates is disposed at the input to PBS 14 and the combination of a quarter wave plate and a half wave plate is disposed at the output of isolator 12.

The fiber cavity comprises 2.5 m. of Corning SMF28 fiber and 45 cm. of Corning Flexcor 1060 fiber, which form a wave length-division multiplexing (WDM) coupler used to launch the pump, and 1.0 m. of erbium doped fiber. The fiber ring is coupled to the bulk wave plates 18 and 20 by lenses 32 and 34 respectively. The ends of the fiber are terminated with Brewster angler couplers 36 and 38.

The fiber ring is excited by an excitation source 40, preferably operating at about 980 nanometers. Preferably, the pump source is selected from a laser diode, a plurality of laser diodes, a light emitting diode, a plurality of light emitting diodes, or a diode MOPA system.

While this particular construct was pumped at approximately 980 nm from a continuous wave Ti:Sapphire oscillator, in accordance with this invention is preferably pumped by a 980 nm diode master oscillator power amplifier (MOPA) configuration (or a series of 980 nm diodes) such as those available commercially from Spectra Diode Labs of San Jose, Calif. The output of this source at its fundamental operating wavelength of 1560 nm, 2, is then focused by focusing system, 3, which is preferably a simple convex glass lens which has a focal length that is preferably in the range of a few centimeters or less into a frequency doubling crystal, 4, which doubles the 1560 nm light to 780 nm at output 5. The frequency doubler, 4, for example, a BBO crystal of length sufficient to maintain a short pulse width, for example 1 mm to a few centimeters, while at the same time providing sufficient power to seed the regenerative amplifier for example in the range of a few pico joules to several hundred pico joules. If additional power is needed to seed the amplifier, an additional diode-pumped amplifier operating at the fundamental wavelength can be placed between the source, 1, and the doubling crystal, 4, or, alternatively, after the doubling crystal and before the ultrashort pulse amplifier. In the latter case, amplification is provided at a wavelength substantially identical to that of the amplifier itself. If a chirp is created as a result of subsequent amplification, it could be removed using chirp compensating and compression techniques such as glass plate for negatively chirped pulses or a prism pair for positively chirped pulses, or any other technique known to those skilled in the art. For this purpose of this discussion, all these possible configurations are meant to be included when we refer to a "solid-state source of ultrashort optical pulses"). This frequency doubled light at approximately 780 nm is directed through a collimating system 6 which is preferably a simple glass lens having the same local length as the focusing systems, then becomes the seed pulse which is directed into a Ti:Sapphire regenerative amplifier 7 and subsequently amplified therein. The amplifier preferably comprises an excitation source such as a laser diode or diodes, a light emitting diode or diodes, a diode MOPA system or a frequency doubled Q-switched YAG or YLF laser coupled to a gain medium such as Ti:Sapphire, Alexandrite, Li:SAF, Li:SGAF, Li:CAF or ZBLAN fiber.

The foregoing description of the invention is intended to be merely exemplary of the invention and those skilled in the art will appreciate that certain changes and modifications to the method and apparatus described above are well within the scope of the invention which is solely defined by the appended claims.

I claim:

1. An apparatus for amplifying ultrashort pulses of light, comprising:

a solid-state source of ultrashort optical pulses having a fundamental wavelength of operation in the range of 1–3 microns;

a solid-state ultrashort optical pulse amplifier having a gain bandwidth that does not overlap the fundamental wavelength of operation of the solid-state source of ultrashort optical pulses; and a frequency converter disposed between said solid-state source of ultrashort pulses and said solid-state ultrashort optical pulse amplifier for converting the fundamental wavelength light output of the solid state source of ultrashort optical pulses to a wavelength that overlaps the gain bandwidth of the solid-state ultrashort optical pulse amplifier.

2. The apparatus of claim 1 in which said solid-state ultrashort optical pulse amplifier is selected from a group consisting of a regenerative-type amplifier, a multipass-type amplifier, or an amplifier containing elements of both a regenerative-type amplifier and a multipass-type amplifier.

3. The apparatus of claim 1 in which said solid-state source of ultrashort optical pulses comprises a fiber-optic gain medium.

4. The apparatus of claim 1 further comprising an excitation source optically coupled to said solid-state source of ultrashort optical pulses for pumping said solid-state source of optical pulses selected from a group comprising a laser diode, a plurality of laser diodes, a light emitting diode, a plurality of light emitting diodes, or a diode MOPA system.

5. The apparatus of claim 1 further comprising an excitation source optically coupled to said solid-state ultrashort pulse amplifier for pumping said solid-state ultrashort pulse amplifier selected from a group comprising a laser diode, a plurality of laser diodes, a light emitting diode, a plurality of light emitting diodes, a diode MOPA system, a frequency doubled, Q-switched YAG laser, or a frequency-doubled, Q-switched YLF laser.

6. The apparatus of claim 1 in which said frequency converter is a crystal for producing a second harmonic of the fundamental of the solid-state source of ultrashort optical pulses.

7. The apparatus of claim 1 in which the solid-state ultrashort optical pulse amplifier comprises a gain medium selected from a group of materials consisting of Ti:Sapphire, Alexandrite, Li:SAF, Li:SGAF, Li:CAF or ZBLAN fiber.

8. The apparatus of claim 2 in which said solid-state source of ultrashort optical pulses comprises a fiber-optic gain medium.

9. The apparatus of claim 2 further comprising an excitation source optically coupled to said solid-state source of ultrashort optical pulses for pumping said solid-state source of optical pulses selected from a group comprising a laser diode, a plurality of laser diodes, a light emitting diode, a plurality of light emitting diodes, or a diode MOPA system.

10. The apparatus of claim 2 further comprising an excitation source optically coupled to said solid-state ultrashort pulse amplifier for pumping said solid-state ultrashort pulse amplifier selected from a group comprising a laser diode, a plurality of laser diodes, a light emitting diode, a plurality of light emitting diodes, a diode MOPA system, a frequency doubled, Q-switched YAG laser, or a frequency-doubled, Q-switched YLF laser.

11. The apparatus of claim 2 in which said frequency converter is a crystal for producing a second harmonic of the fundamental of the solid-state source of ultrashort optical pulses.

12. The apparatus of claim 2 in which the solid-state ultrashort optical pulse amplifier comprises a gain medium selected from a group of materials consisting of Ti:Sapphire, Alexandrite, Li:SAF, Li:SGAF, Li:CAF, or ZBLAN fiber.

13. The apparatus of claim 3 further comprising an excitation source optically coupled to said fiber-optic gain medium for pumping said fiber-optic gain medium selected from a group comprising a laser diode, a plurality of laser diodes, a light emitting diode, a plurality of light emitting diodes, or a diode MOPA system.

14. The apparatus of claim 3 further comprising an excitation source optically coupled to said solid-state ultrashort pulse amplifier for pumping said solid-state ultrashort pulse amplifier selected from a group comprising a laser diode, a plurality of laser diodes, a light emitting diode, a plurality of light emitting diodes, a diode MOPA system, a frequency doubled, Q-switched YAG laser, or a frequency-doubled, Q-switched YLF laser.

15. The apparatus of claim 3 in which said frequency converter is a crystal for producing a second harmonic of the fundamental of the solid-state source of ultrashort optical pulses.

16. The apparatus of claim 3 comprising a plurality of optical fibers arranged in an oscillator amplifier configuration that together form the solid-state source of ultrashort optical pulses.

17. The apparatus of claim 3 in which said fiber-optic gain medium is an Erbium-doped fiber.

18. The apparatus of claim 3 in which the solid-state ultrashort optical pulse amplifier comprises a gain medium selected from a group of materials consisting of Ti:Sapphire, Alexandrite, Li:SAF, Li:SGAF, Li:CAF or ZBLAN fiber.

19. The apparatus of claim 4 further comprising an excitation source optically coupled to said solid-state ultrashort pulse amplifier for pumping said solid-state ultrashort pulse amplifier selected from a group comprising a laser diode, a plurality of laser diodes, a light emitting diode, a plurality of light emitting diodes, a diode MOPA system, a frequency doubled, Q-switched YAG laser, or a frequency-doubled, Q-switched YLF laser.

20. The apparatus of claim 4 in which said frequency converter is a crystal for producing a second harmonic of the fundamental of the solid-state source of ultrashort optical pulses.

21. The apparatus of claim 4 in which the solid-state ultrashort optical pulse amplifier comprises a gain medium selected from a group of materials consisting of Ti:Sapphire, Alexandrite, Li:SAF, Li:SGAF, Li:CAF or ZBLAN fiber.

22. The apparatus of claim 5 in which said frequency converter is a crystal for producing a second harmonic of the fundamental of the solid-state source of ultrashort optical pulses.

23. The apparatus of claim 5 in which the solid-state ultrashort optical pulse amplifier comprises a gain medium selected from a group of materials consisting of Ti:Sapphire, Alexandrite, Li:SAF, Li:SGAF, Li:CAF or ZBLAN fiber.

24. The apparatus of claim 16 further comprising an excitation source optically coupled to said solid-state source of ultrashort optical pulses for pumping said solid-state source of optical pulses selected from a group comprising a laser diode, a plurality of laser diodes, a light emitting diode, a plurality of light emitting diodes, or a diode MOPA system.

25. The apparatus of claim 16 further comprising an excitation source optically coupled to said solid-state ultrashort pulse amplifier for pumping said solid-state ultrashort pulse amplifier selected from a group comprising a laser diode, a plurality of laser diodes, a light emitting diode, a plurality of light emitting diodes, a diode MOPA system, a frequency doubled, Q-switched YAG laser, or a frequency-doubled, Q-switched YLF laser.

26. The apparatus of claim 16 in which said frequency converter is a crystal for producing a second harmonic of the fundamental of the solid-state source of ultrashort optical pulses.

27. The apparatus of claim 16 in which the solid-state ultrashort optical pulse amplifier comprises a gain medium selected from a group of materials consisting of Ti:Sapphire, Alexandrite, Li:SAF, Li:SGAF, Li:CAF or ZBLAN fiber.

28. The apparatus of claim 17 in which said plurality of optical fibers arranged in an oscillator amplifier configuration that together form the solid-state source of ultrashort optical pulses comprises an Erbium-doped fiber.

29. The apparatus of claim 17 in which the solid-state ultrashort optical pulse amplifier comprises a gain medium selected from a group of materials consisting of Ti:Sapphire, Alexandrite, Li:SAF, Li:SGAF, Li:CAF or ZBLAN fiber.

30. The apparatus of claim 17 further comprising an excitation source optically coupled to said solid-state ultrashort pulse amplifier for pumping said solid-state ultrashort pulse amplifier selected from a group comprising a laser diode, a plurality of laser diodes, a light emitting diode, a plurality of light emitting diodes, a diode MOPA system, a frequency doubled, Q-switched YAG laser, or a frequency-doubled, Q-switched YLF laser.

31. The apparatus of claim 17 in which said frequency converter is a crystal for producing a second harmonic of the fundamental of the solid-state source of ultrashort optical pulses.

32. The apparatus of claim 4 in which the solid-state ultrashort optical pulse amplifier comprises a gain medium selected from a group of materials consisting of Ti:Sapphire, Alexandrite, Li:SAF, Li:SGAF, Li:CAF or ZBLAN fiber.

33. The apparatus of claim 17 in which said frequency converter is a crystal for producing a second harmonic of the fundamental of the solid-state source of ultrashort optical pulses.

34. A method of amplifying ultrashort pulses of light, comprising:
generating pulses from a solid-state source of ultrashort optical pulses having a fundamental wavelength of operation in the range of 1–3 microns;
frequency converting said pulses to a wavelength overlapping the gain bandwidth of a solid-state ultrashort optical pulse amplifier;
injecting said frequency converted pulses into a solid-state ultrashort optical pulse amplifier for amplifying them therein.

35. The method of claim 34 in which converting said pulses comprises frequency doubling the pulses.

36. The method of claim 34 further comprising the step of dechirping the pulses prior to the step of frequency converting the pulses.

37. The method of claim 34 further comprising the step of amplifying the pulses prior to the frequency doubling step.

38. The method of claim 34 further comprising the step of amplifying the pulses subsequent to the frequency doubling step.

39. A method of seeding a regenerative amplifier having a given peak operating wavelength from a source of seed oscillations, comprising the steps of:
optically pumping an optical fiber light source to generate an output pulse having a fundamental wavelength that is greater than the peak operating wavelength of the regenerative amplifier;
frequency converting the fundamental wavelength output pulse to generate a pulse having a wavelength substantially equal to the peak operating wavelength of the regenerative amplifier; and
optically coupling the frequency converted pulse into a gain medium of the regenerative amplifier.

40. The method of claim 39 in which the step of optically pumping an optical fiber light source to generate an output pulse comprises incoherently pumping the fiber source.

41. The method of claim 39 in which the step of optically pumping an optical fiber light source to generate an output pulse comprises coherently pumping the fiber source.

42. The method of claim 39 in which the step of optically pumping an optical fiber light source to generate an output pulse comprises generating an output pulse having a FWHM less than about 1 nanosecond.

43. The method of claim 42 in which the step of frequency converting the fundamental wavelength output pulse comprises generating a pulse having a FWHM less than the FWHM of the fundamental pulse.

44. The method of claim 39 in which the step of optically pumping an optical fiber light source to generate an output pulse comprises generating an output pulse having a wavelength of approximately 1550 nanometers.

45. The method of claim 44 in which the step of frequency converting the fundamental wavelength output pulse comprises generating a frequency converted pulse having a wavelength of approximately 780 nanometers.

46. The method of claim 39 in which the step of frequency converting the fundamental wavelength output pulse comprises frequency doubling the fundamental to obtain a second harmonic wavelength.

47. A regenerative optical amplifier system for ultrashort pulse generation, comprising:
a pumped optical fiber source that produces a light output having a fundamental wavelength;
a regenerative amplifier having a peak operating wavelength, arranged to receive said light output; and
a frequency converter disposed between said fiber source and said regenerative amplifier for converting the fundamental wavelength light output to a wavelength substantially equal to the peak operating wavelength of the regenerative amplifier.

48. The regenerative optical amplifier system of claim 47 in which the fundamental light output of the fiber source comprises a pulse having a full width at half maximum (FWHM) less than approximately 1 nanosecond, and further in which the frequency converted light output from the frequency converter comprises a pulse having a FWHM less than the FWHM of the fundamental pulse.

49. The regenerative optical amplifier system of claim 47 further comprising a light emitting diode optically coupled to said fiber source for pumping the fiber source.

50. The regenerative optical amplifier system of claim 49 in which the light emitting diode comprises a diode laser.

51. The regenerative optical amplifier system of claim 47 in which the regenerative amplifier comprises a Ti:Sapphire gain medium.

52. The regenerative optical amplifier system of claim 47 in which the pumped optical fiber source comprises an Erbium-doped fiber laser.

53. The regenerative optical amplifier system of claim 52 in which the regenerative amplifier comprises a gain medium selected from a group of materials consisting of Ti:Sapphire and Alexandrite.

54. The regenerative optical amplifier system of claim 47 in which the frequency converter is a frequency doubler for producing a second harmonic of the fundamental.

55. The regenerative optical amplifier system of claim 47 in which the frequency converter is an optically nonlinear crystal.

56. The regenerative optical amplifier system of claim 47 in which the fundamental wavelength is approximately 1550 nanometers.

57. The regenerative optical amplifier system of claim 47 in which the frequency converted fundamental wavelength is approximately 780 nanometers.

* * * * *

(12) EX PARTE REEXAMINATION CERTIFICATE (8133rd)
United States Patent
Clark

(10) Number: US 5,530,582 C1
(45) Certificate Issued: Apr. 5, 2011

(54) FIBER SOURCE FOR SEEDING AN ULTRASHORT OPTICAL PULSE AMPLIFIER

(75) Inventor: William G. Clark, Pittsford, NY (US)

(73) Assignee: Clark MXR, Inc., Dexter, MI (US)

Reexamination Request:
No. 90/005,220, Jan. 14, 1999

Reexamination Certificate for:
Patent No.: 5,530,582
Issued: Jun. 25, 1996
Appl. No.: 08/427,060
Filed: Apr. 24, 1995

(51) Int. Cl.
*H01S 3/00* (2006.01)

(52) U.S. Cl. .................. 359/333; 359/346; 398/189
(58) Field of Classification Search ............. 359/333, 359/341, 184
See application file for complete search history.

(56) References Cited

U.S. PATENT DOCUMENTS

| | | |
|---|---|---|
| 4,829,529 A | 5/1989 | Kafka |
| 5,513,194 A | 4/1996 | Tamura et al. |

OTHER PUBLICATIONS

Harter et al., "Short Pulse Amplification in Tunable Solid State Materials," SPIE vol. 1229, Femtosecond to Nanosecond High–Intensity Lasers and Applications, pp. 19–28, Jan. 17, 1990.
Tamura et al., "Technique for obtaining high–energy ultrashort pulses from an additive pulse mode–locked erbium–doped fiber ring laser," Optics Letters, vol. 19, No. 1, pp. 46–48, Jan. 1, 1994.
Duling, III, "Compact fiber soliton lasers product ultrashort pulses," Laser Focus World, p. 213, Apr. 1993.
Nabekawa et al., "Terawatt KrF/Ti:sapphire hybrid laser system," Optics Letters, vol. 18, No. 22, pp. 1922–1924, Nov. 15, 1993.
Botez et al., "The Next Generation of High–Power Semiconductor Diode Lasers," TRW Space and Defense Quest, pp. 21–31, Winter 1991/1992.
Bado et al. "Regenerative Amplification in Alexandrite of Pulse from Specialized Oscillators," IEEE Journal of Quantum Electronics, vol. 24, No. 6, p. 1167, Jun. 1988.
Yakymyshyn et al., "Frequency–doubled, additive–pulse, mode–locked NaCl:OH laser," Optics Letters, vol. 14, No. 15, p. 793, Aug. 1, 1989.
Mizoguchi et al., "100–fs, 10 Hz, terawatt KrF laser," J. Opt. Soc. Am. B, vol. 9, No. 4, p. 561, Apr. 1992.
Fermann, M.E. et al, Environmentally Stable Kerr–type Mode–Locked Erbium Fiber Laser Producting 360–fs Pulses, Optics Letters, Jan. 1, 1994, pp. 43–45, vol. 19, No. 1, Optical Society of America.
Fermann, M.E., et al., All–fiber Source of 100–nJ Subpicosecond Pulses, Appl. Phys. Lett. 64 (11), Mar. 1994, pp. 1315–1317, American Institute of Physics.

*Primary Examiner* — Mark Hellner

(57) ABSTRACT

An apparatus for seeding a solid-state, ultrashort optical pulse amplifier system comprises an excitation source that pumps a gain medium which is restricted to the core of an optical fiber. The gain medium is disposed in a resonant cavity with components arranged to produce ultrashort pulses of light at a fundamental wavelength. Such systems are well known to those skilled in the art. These ultrashort pulses are then frequency-doubled in a non-linear crystal to produce a seed pulse whose doubled frequency substantially matches that of the amplifier gain medium. These seed pulses are then injected into the amplifier wherein they are amplified.

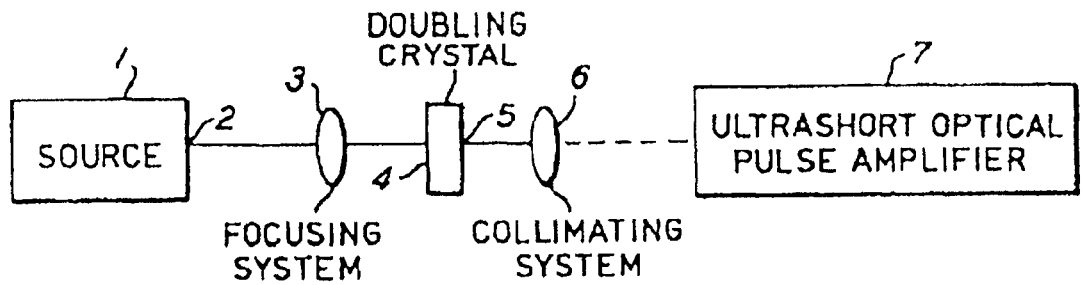

US 5,530,582 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3–6, 8–12, 19–23 and 34–38 are cancelled.

Claims 1, 13–18, 32, 39 and 47 are determined to be patentable as amended.

Claims 2, 7, 24–31, 33, 40–46 and 48–57, dependent on an amended claim, are determined to be patentable.

1. An apparatus for amplifying ultrashort pulses of light, comprising:
   a solid-state source of *non transform limited* ultrashort optical pulses *comprising a fiber optic gain medium and* having a fundamental wavelength of operation in the range of 1-3 microns;
   a solid-state ultrashort optical pulse amplifier having a gain bandwidth that does not overlap the fundamental wavelength of operation of the solid-state source of ultrashort optical pulses; and
   a frequency converter disposed between said solid-state source of ultrashort pulses and said solid-state ultrashort optical pulse amplifier for converting the fundamental wavelength light output of the solid state source of ultrashort optical pulses to a wavelength that overlaps the gain bandwidth of the solid-state ultrashort optical pulse amplifier.

13. The apparatus of claim [3] *1* further comprising an excitation source optically coupled to said fiber-optic gain medium for pumping said fiber-optic gain medium selected from a group comprising a laser diode, a plurality of laser diodes, a light emitting diode, a plurality of light emitting diodes, or a diode MOPA system.

14. The apparatus of claim [3] *1* further comprising an excitation source optically coupled to said solid-state ultrashort pulse amplifier for pumping said solid-state ultrashort pulse amplifier selected from a group comprising a laser diode, a plurality of laser diodes, a light emitting diode, a plurality of light emitting diodes, a diode MOPA system, a frequency doubled Q-switched YAG laser, or a frequency-doubled, Q-switched YLF laser.

15. The apparatus of claim [3] *1* in which said frequency converter is a crystal for producing a second harmonic of the fundamental of the solid-state source of ultrashort optical pulses.

16. The apparatus of claim [3] *1* comprising a plurality of optical fibers arranged in an oscillator amplifier configuration that together form the solid-state source of ultrashort optical pulses.

17. The apparatus of claim [3] *1* in which said fiber-optic gain medium is an Erbium-doped fiber.

18. The apparatus of claim [3] *1* in which the solid-state ultrashort optical pulse amplifier comprises a gain medium selected from a group of materials consisting of Ti:Sapphire, Alexandrite, Li:SAF, Li:SGAF, Li:CAF or ZBLAN fiber.

32. The apparatus of claim [4] *13* in which the solid-state ultrashort optical pulse amplifier comprises a gain medium selected from a group of materials consisting of Ti:Sapphire, Alexandrite, Li:SAF, Li:SGAF, Li:CAF or ZBLAN fiber.

39. A method of seeding a regenerative amplifier having a given peak operating wavelength from a source of seed oscillations, comprising the steps of:
   optically pumping an optical fiber light source to generate [an] *a non transform limited* output pulse having a fundamental wavelength that is greater than the peak operating wavelength of the regenerative amplifier;
   frequency converting the fundamental wavelength output pulse to generate a pulse having a wavelength substantially equal to the peak operating wavelength of the regenerative amplifier; and
   optically coupling the frequency converted pulse into a gain medium of the regenerative amplifier.

47. A regenerative optical amplifier system for ultrashort pulse generation, comprising:
   a pumped optical fiber source that produces a *non transform limited* light output *pulses* having a fundamental wavelength;
   a regenerative amplifier having a peak operating wavelength, arranged to receive said light output; and
   a frequency converter disposed between said fiber source and said regenerative amplifier for converting the fundamental wavelength light output to a wavelength substantially equal to the peak operating wavelength of the regenerative amplifier.

* * * * *